(12) United States Patent
Choi et al.

(10) Patent No.: US 7,358,693 B2
(45) Date of Patent: Apr. 15, 2008

(54) MOTOR DRIVE CONTROL DEVICE

(75) Inventors: Yong-won Choi, Seoul (KR); Yo-han Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 225 days.

(21) Appl. No.: 11/296,208

(22) Filed: Dec. 8, 2005

(65) Prior Publication Data

US 2006/0145642 A1 Jul. 6, 2006

(30) Foreign Application Priority Data

Jan. 6, 2005 (KR) ............. 10-2005-0001336

(51) Int. Cl.
*H02P 1/18* (2006.01)

(52) U.S. Cl. ............ 318/254; 318/439; 318/138; 388/907.2; 327/423; 327/110

(58) Field of Classification Search ............. 318/254, 318/138, 439; 388/907.2; 327/423, 110
See application file for complete search history.

(56) References Cited

U.S. PATENT DOCUMENTS 5,686,859 A * 11/1997 Majumdar et al. ......... 327/530
6,617,913 B1 * 9/2003 Johnson ..................... 327/423
2005/0024102 A1 * 2/2005 Kondo ....................... 327/110

FOREIGN PATENT DOCUMENTS

JP     11-289785     10/1999

* cited by examiner

*Primary Examiner*—Rina Duda
(74) *Attorney, Agent, or Firm*—Greenblum & Bernstein, P.L.C.

(57) ABSTRACT

Disclosed is a motor drive control device which uses mechanical switches configured in an H-bridge shape and can protect the mechanical switches from being damaged and minimize a voltage chattering problem occurring upon switching on and off. The motor drive control device includes: two relay switching units which are coupled to both sides of a motor and each of which is formed in an H-bridge shape and is connected to an output terminal of a bridge circuit; a switching unit which controls a voltage source applied to the relay switching units; and an inverter controller which first controls any one of the relay switching units and then controls the switching unit so that the motor starts to operate, and first controls the switching unit and then controls the one of the relay switching units so that the motor comes to a halt.

14 Claims, 2 Drawing Sheets

Related Art

MOTOR DRIVE CONTROL DEVICE

BACKGROUND OF THE INVENTION

This application claims the priority of Korean Patent Application No. 2005-0001336, filed on Jan. 6, 2005, in the Korean Intellectual Property Office, the disclosure of which is incorporated herein in its entirety by reference.

1. Field of the Invention

The present invention relates to a motor drive control device and, more particularly, to a motor drive control device using a relay switch.

2. Description of Related Art

In general, a motor rotates in the right or reverse direction according to the polarity of voltage applied to the motor. An H-bridge inverter is a circuit configured to switch the polarity of voltage applied from a power supply to the motor. FIG. 1 shows a schematic construction of the H-bridge inverter.

As shown in FIG. 1, a typical H-bridge inverter includes four switching transistors Q1~Q4 configured in an H-bridge shape with respect to a motor (M). In the H-bridge inverter thus configured, when the switching transistors Q1 and Q4 are turned on, current flows through Q1→motor (M)→Q4, causing the motor to rotate in the right direction. When the switching transistors Q2 and Q3 are turned on, current flows through Q3→motor (M)→Q2, causing the motor to rotate in the reverse direction. In addition, when the switching transistors Q1 and Q3 are turned on, the motor stops operating.

There is a problem in the typical H-bridge inverter in that it is complex to control the motor since four active switches should be controlled to drive the motor. Further, since circuits for using and controlling the four active switches are to be configured, the construction of the entire system becomes complicated and the cost increases.

Alternatively, the H-bridge inverter may be configured using mechanical switches (i.e., relays) to reduce the cost. However, in this case, spark occurs each time the switches are switched on and off, as shown in FIG. 2. This may cause the life of the switch to be reduced and may cause neighboring circuits to be damaged.

SUMMARY OF THE INVENTION

The present invention provides a motor drive control device which uses mechanical switches configured in an H-bridge shape and can protect the mechanical switches from being damaged and minimize a voltage chattering problem occurring upon switching on and off.

According to an aspect of the present invention, there is provided a motor drive control device including: two relay switching units which are coupled to both sides of a motor and each of which is formed in an H-bridge shape and is connected to an output terminal of a bridge circuit; a switching unit which controls a voltage source applied to the relay switching units; and an inverter controller which first controls any one of the relay switching units and then controls the switching unit so that the motor starts to operate, and first controls the switching unit and then controls the one of the relay switching units so that the motor comes to a halt.

In addition, when the motor comes to a halt, the inverter controller may first switch off the switching unit and then control the relaying switching unit after a winding current of the motor becomes zero.

According to the present invention thus configured, the switching unit provided at the previous stage of the bridge circuit is controlled so that a voltage source is supplied to drive the motor after switching the contact of the relay switching unit configured in an H-bridge shape, while the switching unit is controlled so that the contact of the relay switching unit is switched after the voltage source is disconnected to halt the motor. Accordingly, it is possible to protect the relay switches from being damaged and to minimize a voltage chattering problem occurring upon switching on and off.

According to another aspect of the present invention, there is provided a motor drive control device including: a switching unit which is provided between an AC voltage source and a bridge circuit and controls supplying of the voltage source; a smoothing capacitor connected to an output terminal of the bridge circuit; a first relay switching unit which connects a positive (+) input terminal of the motor to either the output terminal of the bridge circuit or a reference node (GND) according to an applied relay switch control signal; a second relay switching unit which connects a negative (−) input terminal of the motor to either the output terminal of the bridge circuit or the reference node (GND) according to the applied relay switch control signal; and an inverter controller which first controls any one of the relay switching units and then controls the switching unit so that the motor starts to operate, and first controls the switching unit and then controls the one of the relay switching units so that the motor comes to a halt.

In addition, when the motor comes to a halt, the inverter controller may first switch off the switching unit and then control the relaying switching unit after a winding current of the motor becomes zero.

According to the present invention thus configured, the switching unit provided at the previous stage of the bridge circuit is controlled so that a voltage source is supplied to drive the motor after switching the contact of the relay switching unit configured in an H-bridge shape, while the switching unit is controlled so that the contact of the relay switching unit is switched after the voltage source is disconnected to halt the motor. Accordingly, it is possible to protect the relay switches from being damaged and to minimize a voltage chattering problem occurring upon switching on and off.

According to a further aspect of the present invention, there is provided a motor drive control device including: a switching unit which controls supplying of a DC voltage; a smoothing capacitor connected to an output terminal of the switching unit; a first relay switching unit which connects a positive (+) input terminal of the motor to either the output terminal of the switching unit or a reference node (GND) according to an applied relay switch control signal; a second relay switching unit which connects a negative (−) input terminal of the motor to either the output terminal of the switching unit or the reference node (GND) according to the applied relay switch control signal; and an inverter controller which first controls any one of the relay switching units and then controls the switching unit so that the motor starts to operate, and first controls the switching unit and then controls the one of the relay switching units so that the motor comes to a halt.

In addition, when the motor comes to a halt, the inverter controller may first switch off the switching unit and then control the relaying switching unit after a winding current of the motor becomes zero.

According to the present invention thus configured, the switching unit provided at the previous stage of the bridge circuit is controlled so that a voltage source is supplied to drive the motor after switching the contact of the relay switching unit configured in an H-bridge shape, while the switching unit is controlled so that the contact of the relay switching unit is switched after the voltage source is disconnected to halt the motor. Accordingly, it is possible to protect the relay switches from being damaged and to minimize a voltage chattering problem occurring upon switching on and off.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments in accordance with the present invention will now be described in detail with reference to the accompanying drawings.

Figure 1:
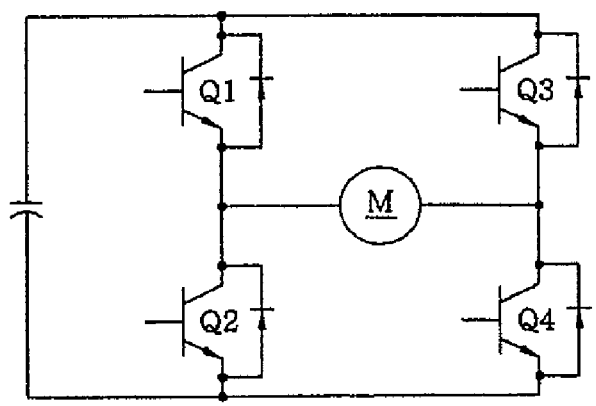
FIG. 1 is a diagram showing a construction of a typical H-bridge inverter.
Figure 2:
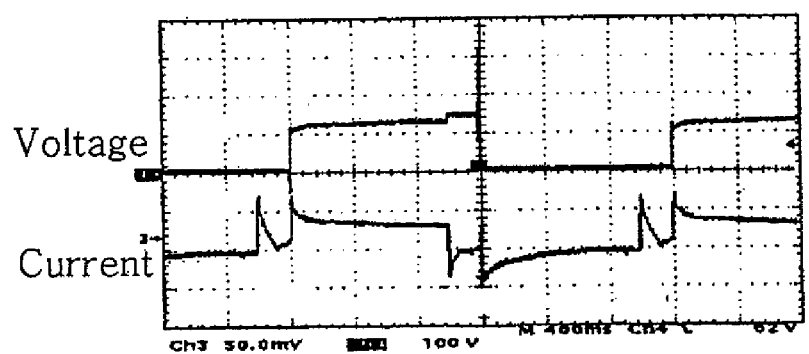
FIG. 2 is a voltage waveform diagram based on operation of a typical relay switch.
Figure 3:
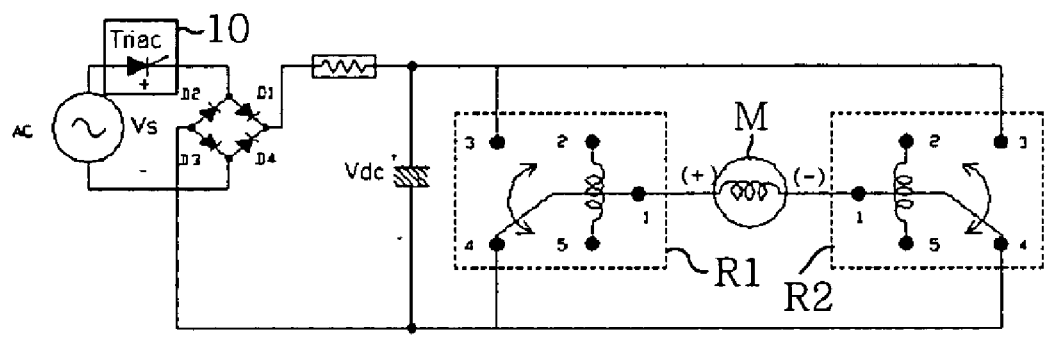
FIG. 3 is a diagram showing a construction of a motor drive control device in accordance with an embodiment of the present invention.
Figure 4:
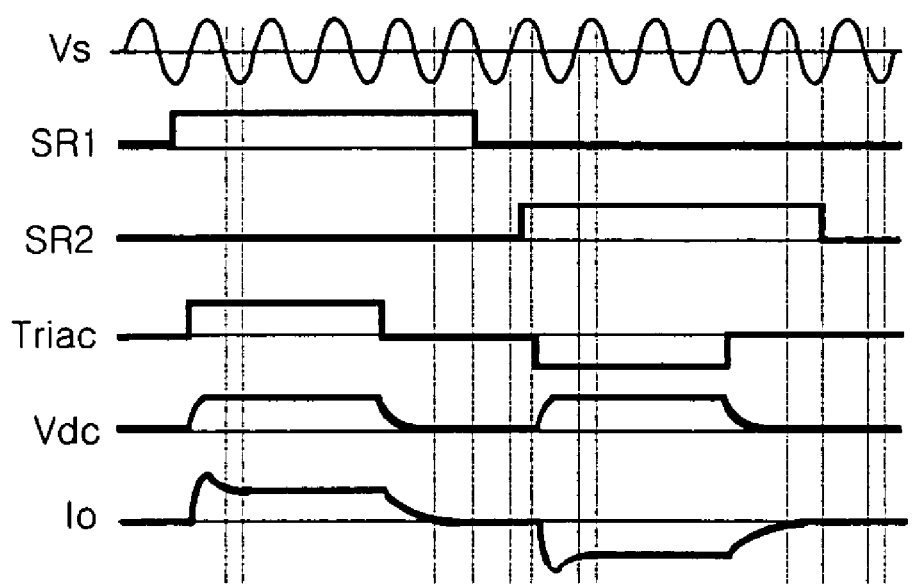
FIG. 4 is a timing diagram showing operation of a motor drive control device in accordance with an embodiment of the present invention.

FIG. 3 is a diagram showing a construction of a motor drive control device in accordance with an embodiment of the present invention. FIG. 4 is a timing diagram showing operation of a motor drive control device in accordance with an embodiment of the present invention.

Referring to FIG. 3, the motor drive control device includes a switching unit 10 which is provided between an alternating current (AC) voltage source and a bridge circuit (D1~D4) and controls the AC voltage source. The switching unit 10 may be implemented by a triac which is switched on and off by the following inverter controller 20.

For reference, AC voltage supplied through the switching unit 10 is full-wave rectified by the bridge circuit (D1~D4), smoothed out by a smoothing capacitor, and supplied to the following H-bridge circuit.

Meanwhile, as shown in FIG. 3, the motor drive control device further includes two relay switching units R1, R2 which are coupled to both sides of the motor in an H-bridge shape.

A first relay switching unit R1 connects a positive (+) input terminal of the motor to either an output terminal of the bridge circuit (D1~D4) or a reference node (GND) according to a relay switch control signal SR1 outputted from the inverter controller 20. In addition, a second relay switching unit R2 connects a negative (−) input terminal of the motor to either the output terminal of the bridge circuit (D1~D4) or the reference node (GND) according to a relay switch control signal SR2 outputted from the inverter controller 20. Each of the relay switching units R1, R2 may be implemented by a single two-form relay switch.

The two-form relay switch is operated as follows. That is, when current flows in a coil, current flows by an electromagnetic force and a contact point is changed. Then, when current does not flow in the coil, the switch returns to an initial contact location by a restoring force of a spring. Alternatively, each of the relay switching units R1, R2 may be implemented by two one-form relay switches. However, the relay switching units thus configured are not preferable since there is a problem in that a construction for controlling the switches becomes complicated and the H-bridge circuit increases in size.

The motor drive control device further includes the inverter controller 20 for controlling the switching units 10, R1, R2. The inverter controller 20 drives the motor by first controlling any one of the relay switching units R1, R2 and in turn controlling the switching unit 10. In addition, the inverter controller 20 stops operating the motor by first controlling the switching unit 10 and in turn controlling the one of the relay switching units R1, R2.

The motor drive control device thus configured will now be described in detail with reference to FIGS. 3 and 4.

First, suppose that switches of each of the relay switching units R1, R2 are located at a contact 4 during an initial state. In this case, the motor is in a halt state.

As shown in FIG. 4, to rotate the motor in the right direction, the inverter controller 220 generates and outputs a relay switch control signal SR1 of a high level to the first relay switching unit R1. Accordingly, a switch of the first relay switching unit R1 moves to a contact 3 so that the positive (+) input terminal of the motor is connected to the output terminal of the bridge circuit (D1~D4).

The inverter controller 20 which has first controlled the relay switching unit R1 outputs a high-level gate control signal to turn on the switching unit 10, the triac, as shown in FIG. 4, so that the motor rotates in the right direction.

The inverter controller 20 switches the gate control signal from a high-level to a low-level to block the voltage source applied to the motor, halting the motor rotating in the right direction. The inverter controller 20 which has switched off the switching unit 10 to stop operating the motor blocks current applied to a coil of the relay switching unit R1 to move the switch back to the contact 4 after a winding current $I_o$ of the motor has become zero. That is, to protect the contacts of the relay switch from being damaged, the first relay switching unit R1 is controlled after the winding current $I_o$ becomes zero.

For reference, the time that it takes for the winding current of the motor to become zero is determined by a motor time constant with an allowable margin. Data with respect to time is recorded on an internal memory of the inverter controller 20.

Meanwhile, the motor can be controlled to rotate in the reverse direction using the above-mentioned method. That is, the inverter controller 20 first controls the second relay switching unit R2 to move a switch of the second relay switching unit R2 to a contact 3 and in turn controls the switching unit 10 so that a reverse voltage is applied to a negative (−) input terminal of the motor, rotating the motor in the reverse direction.

To halt the motor rotating in the reverse direction, the inverter controller 20 first outputs a gate control signal to turn off the switching unit 10 and in turn blocks current applied to a coil of the relay switching unit R2 after the winding current $I_o$ of the motor has become zero.

Since the relay switching unit R2 is first controlled and the switching unit 10 is then controlled when the motor starts to operate, and the switching unit 10 is first controlled and the relay switching unit R2 is then controlled when the motor comes to a halt, the output voltage of the bridge circuit (D1~D4) is always zero when the contacts of the relay are changed, thereby preventing the relay contacts from being damaged.

Although the switching unit 10 is located at the previous stage of the bridge circuit (D1~D4) to control supplying of an AC voltage in the above-mentioned embodiment, the switching unit 10 may be provided at the following stage of the bridge circuit (D1~D4) to control supplying of a DC voltage.

That is, a motor drive control device in accordance with another embodiment of the present invention includes: a switching unit which controls supplying of a DC voltage; a smoothing capacitor connected to an output terminal of the switching unit; a first relay switching unit which connects a positive (+) input terminal of the motor to either the output terminal of the switching unit or a reference node (GND) according to an applied relay switch control signal; a second relay switching unit which connects a negative (−) input terminal of the motor to either the output terminal of the switching unit or the reference node (GND) according to the applied relay switch control signal; and an inverter controller which first controls any one of the relay switching units and then controls the switching unit so that the motor starts to operate, and first controls the switching unit and then controls the one of the relay switching units so that the motor comes to a halt. For reference, the switching unit can be implemented by active switching elements (BJT, IGBT) which can be switched on and off by the inverter controller.

The motor drive control device thus configured can also protect the relay contacts from being damaged and minimize a voltage chattering problem by switching a contact of the relay switching unit and then supplying a voltage to drive the motor, and by returning the contact of the relay switching unit to an initial location and then blocking the voltage supply, as in the first embodiment of the present invention.

As apparent from the above description, according to the present invention, it is possible to protect mechanical switches constituting the H-bridge circuit and minimize the voltage chattering problem occurring upon switching on and off by adjusting switching sequences of the switching unit, which controls supplying of a voltage source, and the relay switches, which constitute an H-bridge circuit.

Further, the cost is reduced since the H-bridge circuit is formed using the relay switches.

While the present invention has been described with reference to exemplary embodiments thereof, it will be understood by those skilled in the art that various changes in form and details may be made therein without departing from the scope of the present invention as defined by the following claims.

What is claimed is:

1. A motor drive control device, comprising:
   two relay switching units which are coupled to a motor in an H-bridge connection, and are connected to an output terminal of a bridge circuit;
   a single switching unit, provided between an alternating current (AC) voltage source and the bridge circuit, which controls a connection of the voltage source to the relay switching units; and
   an inverter controller which drives the motor by operating one of the relay switching units and then controlling the switching unit to connect the voltage source to the relay switching units, and stops the motor by controlling the switching unit to disconnect the voltage source from the relay switching units and then operating the one relay switching unit.

2. The motor drive control device of claim 1, wherein when the inverter controller stops the motor, it operates the one relay switching unit only after a winding current of the motor has decreased to zero.

3. The motor drive control device of claim 1, wherein the switching unit is a triac.

4. The motor drive control device of claim 1, wherein the relay switching units are two-form relay switches.

5. A motor drive control device, comprising:
   a single switching unit which is provided between an alternating current (AC) voltage source and a bridge circuit and controls a supply of the voltage source;
   a smoothing capacitor connected to an output terminal of the bridge circuit;
   a first relay switching unit which connects a positive input terminal of the a motor to either the output terminal of the bridge circuit or a reference node according to an applied relay switch control signal;
   a second relay switching unit which connects a negative input terminal of the motor to either the output terminal of the bridge circuit or the reference node according to an applied relay switch control signal; and
   an inverter controller which drives the motor by operating one of the relay switching units and then controlling the switching unit to connect the voltage source to the relay switching units, and stops the motor by controlling the switching unit to disconnect the voltage source from the relay switching units and then operating the one relay switching unit.

6. The motor drive control device of claim 5, wherein when the inverter controller stops the motor, it operates the one relay switching unit only after a winding current of the motor has decreased to zero.

7. The motor drive control device of claim 5, wherein the switching unit is a triac.

8. The motor drive control device of claim 5, wherein the relay switching units are two-form relay switches.

9. A motor drive control device, comprising:
   a single switching unit, connected to an output of a bridge circuit, which controls a supply of a DC voltage;
   a smoothing capacitor connected to an output terminal of the switching unit;
   a first relay switching unit which connects a positive input terminal of a motor to either the output terminal of the switching unit or a reference node according to an applied relay switch control signal;
   a second relay switching unit which connects a negative input terminal of the motor to either the output terminal of the switching unit or the reference node according to an applied relay switch control signal; and
   an inverter controller which drives the motor by operating one of the relay switching units and then controlling the switching unit to connect the voltage source to the relay switching units, and stops the motor by controlling the switching unit to disconnect the voltage source from the relay switching units and then operating the one relay switching unit.

10. The motor drive control device comprising of claim 9, wherein when the inverter controller stops the motor, it operates the one relay switching unit only after a winding current of the motor has decreased to zero.

11. The motor drive control device comprising of claim 9, wherein the switching unit is an active switching element which is turned on/off by the inverter controller.

12. The motor drive control device of claim 9, wherein the relay switching units are two-form relay switches.

13. A motor drive control device, comprising:
    two relay switching units which are coupled to a motor in an H-bridge connection, and are connected to an output terminal of a bridge circuit;

a single switching unit, connected to an output of a bridge circuit, which controls a connection of a DC voltage source to the relay switching units; and an inverter controller which drives the motor by operating one of the relay switching units and then controlling the switching unit to connect the voltage source to the relay switching units, and stops the motor by controlling the switching unit to disconnect the voltage source from the relay switching units and then operating the one relay switching unit.

14. The motor drive control device of claim 13, wherein the switching unit is an active switching element which is turned on/off by the inverter controller.

* * * * *

UNITED STATES PATENT AND TRADEMARK OFFICE
CERTIFICATE OF CORRECTION

| | |
|---|---|
| PATENT NO. | : 7,358,693 B2 |
| APPLICATION NO. | : 11/296208 |
| DATED | : April 15, 2008 |
| INVENTOR(S) | : Y. Choi et al. |

It is certified that error appears in the above-identified patent and that said Letters Patent is hereby corrected as shown below:

At column 6, line 12 (claim 5, line 8) of the printed patent, after "of" delete "the".

Signed and Sealed this

Twenty-eighth Day of October, 2008

JON W. DUDAS
*Director of the United States Patent and Trademark Office*